United States Patent
Mune et al.

(10) Patent No.: US 6,842,576 B2
(45) Date of Patent: Jan. 11, 2005

(54) POLYMER LIGHTGUIDE

(75) Inventors: Kazunori Mune, Ibaraki (JP); Amane Mochizuki, Ibaraki (JP); Takami Hikita, Ibaraki (JP); Kenichi Tagawa, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/846,657

(22) Filed: May 17, 2004

(65) Prior Publication Data

US 2004/0234228 A1 Nov. 25, 2004

(30) Foreign Application Priority Data

May 19, 2003 (JP) ..................................... P.2003-140278

(51) Int. Cl.$^7$ ............................. G02B 6/00; G03C 3/00; C08G 73/00
(52) U.S. Cl. ...................... 385/141; 385/143; 385/145; 385/129; 385/130; 430/18; 528/170
(58) Field of Search ................................ 385/141, 143, 385/129, 145, 130; 430/18; 528/170

(56) References Cited

U.S. PATENT DOCUMENTS

| | | | |
|---|---|---|---|
| 6,001,517 A | * | 12/1999 | Kawamonzen ................ 430/18 |
| 6,159,654 A | * | 12/2000 | Machida et al. ........... 430/270.1 |
| 6,183,934 B1 | * | 2/2001 | Kawamonzen ............ 430/270.1 |
| 6,455,208 B1 | * | 9/2002 | Yamashiki et al. ............. 430/7 |
| 6,489,431 B1 | * | 12/2002 | Ishii et al. .................... 528/170 |

FOREIGN PATENT DOCUMENTS

| | | |
|---|---|---|
| JP | 02-281037 A | 11/1990 |
| JP | 04-008734 A | 1/1992 |
| JP | 04-009807 A | 1/1992 |
| JP | 05-164929 A | 6/1993 |
| JP | 06-051146 A | 2/1994 |

OTHER PUBLICATIONS

"Polymer Frontier 2121", Series No. 3, pp. 99–121, edited by the Society of Polymer Science, Japan (Published by NTS Inc.).

* cited by examiner

*Primary Examiner*—Brian M. Healy
(74) *Attorney, Agent, or Firm*—Sughrue Mion, PLLC

(57) ABSTRACT

The present invention provides a polymer lightguide which has a waveguide layer comprising a polyimide having a repeating unit represented by general formula (I):

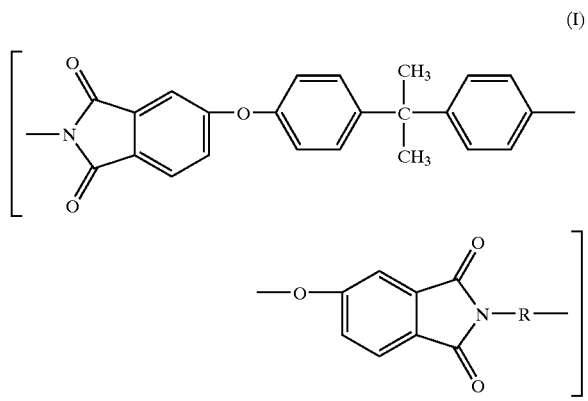

wherein R represents a bivalent organic group.

7 Claims, 1 Drawing Sheet

POLYMER LIGHTGUIDE

FIELD OF THE INVENTION

The present invention relates to a polymer lightguide. More particularly, the invention relates to a polymer lightguide in which the waveguide layer is made of a polyimide having high heat resistance and high transparency and which hence has a low transmission loss and is inexpensive.

BACKGROUND OF THE INVENTION

Important optical parts for use in optical communication, interest in which is rapidly increasing in recent years, include optical multiplexer/demultiplexers (optical couplers), optical splitter/couplers, optical isolators, and optical fiber amplifiers. Recently, however, waveguide type devices are thought to be promising. Although the passive lightguide devices which presently have the highest performance and are most reliable are glass waveguides, they have problems concerning production thereof, for example, because the production process involves a high-temperature step conducted at 1,000° C. or higher.

Many proposals have hence been made recently on a polymer lightguide which employs a polymeric material as a waveguide layer. In particular, a fluorine-containing polyimide resin is attracting attention as a polymeric material for waveguide layers because it has excellent properties such as transparency, high heat resistance, and low hygroscopicity. Various processes for producing a polymer lightguide employing such a fluorine-containing polyimide resin have been proposed (see, for example, Patent Documents 1 to 5).

Lightguides employing poly(methyl methacrylate), a polycarbonate, an ultraviolet-cured resin or the like as a waveguide layer have been proposed as polymer lightguides employing a polymeric material other than fluorinated polyimides. Part of these polymer lightguides are being put to practical use as compact substitutes in the field of optical-fiber parts and as more inexpensive substitutes in the field of silica-based lightguides. Furthermore, polymer lightguides are being used as key devices in optical communication so as to take advantage of the low-temperature processability and mechanical flexibility characteristic of the polymers, and the range of applications thereof is expanding (see, for example, Non-Patent Document 1).

The polymeric materials including poly(methyl methacrylate) mentioned above are inexpensive and easy to process and are hence useful in attaining an area increase and a cost reduction in lightguides. In addition, it is expected that a functional lightguide can be realized by blending such a polymeric material with a functional compound or introducing a functional group into the polymer skeleton. Furthermore, since polymeric materials have a larger thermo-optic constant and larger electro-optic constant than silica, application of such polymeric materials to light switches is expected to attain a reduction in power consumption.

However, since poly(methyl methacrylate) has a glass transition temperature (Tg) as low as about 100° C., there is a possibility that it might soften thermally during processing. Poly(methyl methacrylate) further has a problem that when it is used alone, it is impossible to control the refractive index. On the other hand, conventional fluorinated polyimides have excellent transparency in communication wavelength regions (1.3 μm, 1.55 μm). However, in a shorter-wavelength region of around 0.85 μm, the polyimides show considerable absorption and are unsuitable for use as a polymeric material for waveguide layers.

In addition, since conventional fluorinated polyimides are expensive, it seems difficult for the polyimides to meet the desire for cost reduction which desire is expected to grow in the future. Although aliphatic polyimides and alicyclic polyimides have transparency in a 0.85-μm region, they have a problem that they are inferior in heat resistance to aromatic polyimides.

Patent Document 1: JP 2-280137 A
Patent Document 2: JP 4-008734 A
Patent Document 3: JP 4-009807 A
Patent Document 4: JP 5-164929 A
Patent Document 5: JP 6-051146 A
Non-Patent Document 1: Polymer Frontier 2121 Series No. 3, edited by The Society of Polymer Science, Japan (published by NTS Inc.) pp. 99–121

SUMMARY OF THE INVENTION

The invention has been made in order to overcome the above-described problems in polymer lightguides.

Accordingly, an object of the invention is to provide a polymer lightguide which has a waveguide layer having a low transmission loss and being made of a polyimide having the excellent heat resistance inherent in polyimides and further having excellent transparency, and which can hence be produced at low cost.

Other objects and effects of the invention will become apparent from the following description.

The invention provides a polymer lightguide which has a waveguide layer comprising a polyimide having a repeating unit represented by general formula (I):

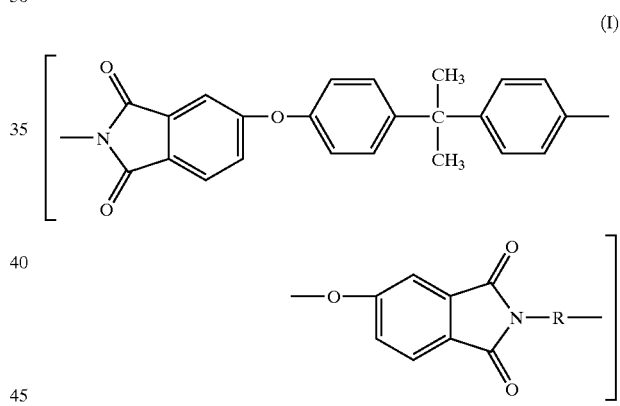

wherein R represents a bivalent organic group.

Figure 1:
FIGS. 1(A) to 1(D) are views illustrating steps for producing a lightguide according to the invention.
Figure 1:
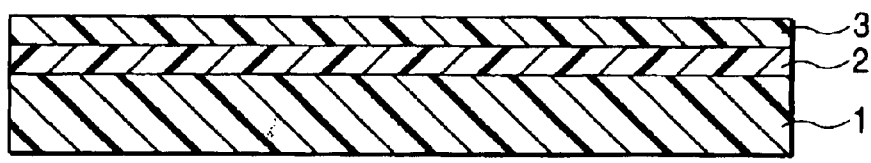
Figure 1:
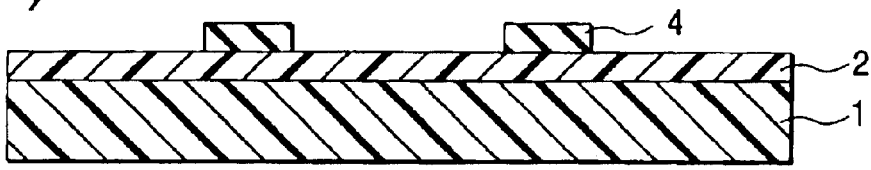
Figure 1:
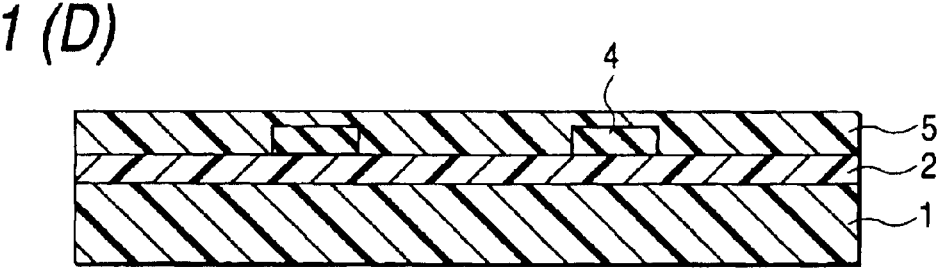

The reference numerals used in the drawings denote the followings, respectively.

1: Substrate
2: Lower cladding layer
3: Polyimide film
4: Core layer (Waveguide layer)
5: Upper cladding layer

DETAILED DESCRIPTION OF THE INVENTION

In general, a lightguide comprises a core layer which is a waveguide layer having a high refractive index and a cladding layer which surrounds the core layer. For example, an embedded type lightguide is obtained by forming a core layer on a lower cladding layer disposed on an appropriate substrate and forming an upper cladding layer to coat this core layer and the lower cladding layer therewith.

In the lightguide of the invention, the waveguide layer comprises a polyimide having a repeating unit represented by general formula (I). This polyimide can be obtained by reacting 2,2-bis[4-(3,4-dicarboxyphenoxy)phenyl]propane dianhydride (BSAA), which is represented by the following formula (IV):

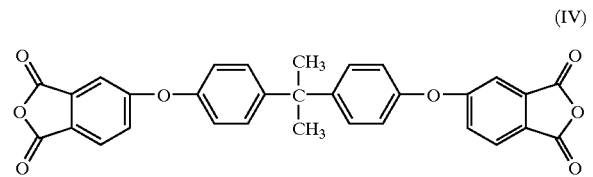
(IV)

with a diamine represented by general formula (V)

(wherein R is the same as defined above)
to obtain a poly(amic acid) represented by general formula (VI):

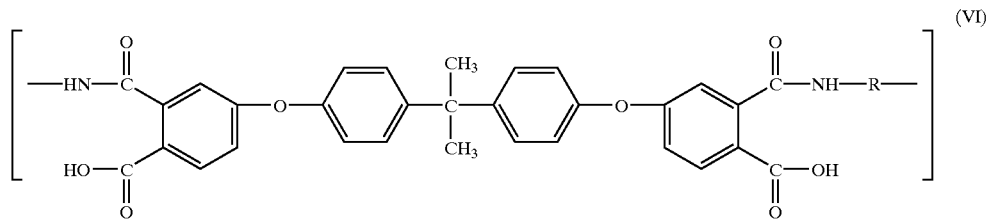
(VI)

(wherein R is the same as defined above)
and thermally or chemically imidizing the poly(amic acid).

The diamine in the invention may be either an aromatic or an aliphatic diamine. Examples thereof include 2,2'-dimethyl-4,4'-diaminobiphenyl, 2,2'-difluoro-4,4'-diaminobiphenyl, 2,2'-dichloro-4,4'-diaminobiphenyl, 2,2'-bis(trifluoromethyl)-4,4'-diaminobiphenyl, 4,4-(9-fluorenylidene)diamine, 3,3'-dimethyl-4,4'-diaminobiphenyl, m-phenylenediamine, o-phenylenediamine, p-phenylenediamine, m-aminobenzylamine, p-aminobenzylamine, 4,4'-diaminodiphenyl ether, 3,3'-diaminodiphenyl ether, 3,4'-diaminodiphenyl ether, bis(3-aminophenyl) sulfide, bis(4-aminophenyl) sulfide, 3-aminophenyl 4-aminophenyl sulfide, bis(3-aminophenyl) sulfoxide, bis(4-aminophenyl) sulfoxide, 3-aminophenyl 4-aminophenyl sulfoxide, bis(3-aminophenyl) sulfone, bis(4-aminophenyl) sulfone, 3-aminophenyl 4-aminophenyl sulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, bis[4-(3-aminophenoxy)phenyl]methane, bis[4-(4-aminophenoxy)phenyl]methane, 1,1-bis[4-(3-aminophenoxy)phenyl]ethane, 1,2-[4-(3-aminophenoxy)phenyl]ethane, 1,1-bis[4-(4-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3-aminophenoxy)pheny]butane, 2,2-bis[3-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis(3-aminophenoxy)benzene, 1,3-bis(4-aminophenoxy) benzene, 1,4-bis(3-aminophenoxy)benzene, 1,4-bis(4-aminophenoxy)benzene, 4,4'-bis(3-aminophenoxy) biphenyl, 4,4'-bis(4-aminophenoxy)biphenyl, bis[4-(3-aminophenoxy)phenyl] ketone, bis[4-(4-aminophenoxy) phenyl] ketone, bis[4-(3-aminophenoxy)phenyl] sulfide, bis[4-(4-aminophenoxy)phenyl]sulfide, bis[4-(3-aminophenoxy)phenyl) sulfoxide, bis[4-(4-aminophenoxy) phenyl] sulfoxide, bis(4-(3-aminophenoxy)phenyl) sulfone, bis(4-(4-aminophenoxy)phenyl] sulfone, bis[4-(3-aminophenoxy)phenyl] ether, bis[4-(4-aminophenoxy) phenyl] ether, 1,4-bis[4-(3-aminophenoxy)benzoyl] benzene, 1,3-bis[4-(3-aminophenoxy)benzoyl]benzene, 4,4'-bis[3-(4-aminophenoxy)benzoyl)diphenyl ether, 4,4'-bis[3-(3-aminophenoxy)benzoyl]diphenyl ether, 4,4'-bis[4-(4-amino-α, α-dimethylbenzyl)phenoxy]benzophenone, 4,4'-bis[4-(4-amino-α,α-dimethylbenzyl)phenoxy]diphenyl sulfone, bis[4-{4-(4-aminophenoxy)phenoxy}phenyl] sulfone, 1,4-bis[4-(4-aminophenoxy)phenoxy-α,α-dimethylbenzyl]benzene, 1,3-bis[4-(4-aminophenoxy) phenoxy-α,α-dimethylbenzyl]benzene, 1,3-bis[4-(4-amino-6-trifluoromethylphenoxy)-α,α-dimethylbenzyl]benzene, 1,3-bis[4-(4-amino-6-fluorophenoxy)-α,α-dimethylbenzyl] benzene, 1,3-bis[4-(4-amino-6-methylphenoxy)-α,α-dimethylbenzyl)benzene, 1,3-bis[4-(4-amino-6-cyanophenoxy)-α,α-dimethylbenzyl]benzene, 3,3'-diamino-4,4'-diphenoxybenzophenone, 4,4'-diamino-5,5'-diphenoxybenzophenone, 3,4'-diamino-4,5'-diphenoxybenzophenone, 3,3'-diamino-4-phenoxybenzophenone, 4,4'-diamino-5-phenoxybenzophenone, 3,4'-diamino-4-phenoxybenzophenone, 3,4'-diamino-5'-phenoxybenzophenone, 3,3'-diamino-4,4'-dibiphenoxybenzophenone, 4,4'-diamino-5,5'-dibiphenoxybenzophenone, 3,4'-diamino-4,5'-dibiphenoxybenzophenone, 3,3'-diamino-4-biphenoxybenzophenone, 4,4'-diamino-5-biphenoxybenzophenone, 3,4'-diamino-4-biphenoxybenzophenone, 3,4'-diamino-5'-biphenoxybenzophenone, 1,3-bis(3-amino-4-phenoxybenzoyl)benzene, 1,4-bis(3-amino-4-phenoxybenzoyl)benzene, 1,3-bis(4-amino-5-phenoxybenzoyl)benzene, 1,4-bis(4-amino-5-phenoxybenzoyl)benzene, 1,3-bis(3-amino-4-biphenoxybenzoyl)benzene, 1,4-bis(3-amino-4-biphenoxybenzoyl)benzene, 1,3-bis(4-amino-5-biphenoxybenzoyl)benzene, 1,4-bis(4-amino-5-biphenoxybenzoyl)benzene, 2,6-bis[4-(4-amino-α,α-dimethylbenzyl)phenoxy]benzonitrile, 6,6'-bis(2-aminophenoxy) -3,3,3',3'-tetramethyl-1,1'-spirobiindane, 6,6'-bis(3-aminophenoxy)-3,3,3',3'-tetramethyl-1,1'-spirobiindane, and 6,6'-bis(3-aminophenoxy)-3,3,3',3'-tetramethyl-1,1'-spirobiindane. Such diamines may be used alone or as a mixture of two or more thereof.

In the invention, the diamine to be used preferably is an aromatic diamine from the standpoint of heat resistance. However, a combination of an aromatic diamine and an aliphatic diamine may be used according to need.

In the diamine represented by general formula (V), the bivalent group R is a diamine residue, i.e., the bivalent group formed by removing the two amino groups from the diamine structure. Especially preferably used according to the invention among the diamines enumerated above are diamines represented by general formula (V) wherein the bivalent group R, which is a diamine residue, is represented by general formula (II):

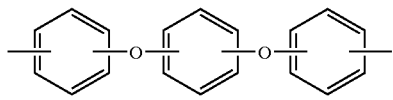

or formula (III):

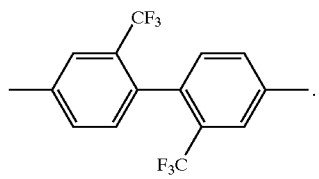

Namely, it is especially preferred according to the invention that at least one member selected from 1,3-bis(3-aminophenoxy)benzene, 1,3-bis(4-aminophenoxy)benzene, 1,4-bis(3-aminophenoxy)benzene, 1,4-bis(4-aminophenoxy)benzene, and 2,2'-bis(trifluoromethyl)-4,4'-diaminobiphenyl be used as the diamine especially from the standpoint of transparency. It is also preferred according to the invention to use alicyclic diamines. Namely, diamines represented by general formula (V) wherein the bivalent group R is an alicyclic diamine residue also are advantageously used. Examples of such alicyclic diamines include isophoronediamine.

Accordingly, the poly(amic acid) obtained by reacting such a diamine with 2,2-bis[4-(3,4-dicarboxyphenoxy) phenyl]propane dianhydride (BSAA) preferably is one represented by general formula (VI) wherein the bivalent group R is represented by general formula (II) or formula (III). Furthermore, the lightguide of the invention, which has a waveguide layer comprising a polyimide represented by general formula (I), preferably is one in which the polyimide constituting the waveguide layer is likewise represented by general formula (I) wherein the bivalent group R is represented by general formula (II) or formula (III), because this polyimide is derived from the poly(amic acid) as a precursor therefor.

According to the invention, the 2,2-bis[4-(3,4-dicarboxyphenoxy)phenyl]propane dianhydride (BSAA) may be used in combination with one or more other acid anhydrides as long as use of these optional anhydrides does not impair the performance of the resulting polyimide. Examples of such acid anhydrides include pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,2'-bis(3,4-dicarboxyphenyl)-1,1,1,3,3,3-hexafluoropropane dianhydride, 1,4-difluoropyromellitic dianhydride, 1,4-bis (trifluoromethyl)pyromellitic dianhydride, 1,4-bis(3,4-dicarboxytrifluorophenoxy)tetrafluorobenzamine dianhydride, 2,2¹-bis[4-(3,4-dicarboxyphenoxy)benzene]-1, 1,1,3,3,3-hexafluoropropane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 1,2,3,4-butanetetracarboxylic dianhydride, and 1,2,3,4-cyclobutanetetracarboxylic dianhydride. These acid anhydrides also may be used alone or as a mixture of two or more thereof.

The poly(amic acid) described above can be obtained by reacting 2,2-bis[4-(3,4-dicarboxyphenoxy)phenyl]propane dianhydride (BSAA) with the diamine preferably in an organic solvent. Thus, the polymer is obtained usually in the form of a solution.

Examples of the organic solvent include N,N-dimethylacetamide, N,N-dimethylformamide N,N-diethylacetamide, N,N-dimethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis [2-(2-methoxyethoxy)ethyl] ether, tetrahydrofuran, 1,3-dioxane, 1,4-dioxane, pyrroline, picoline, dimethyl sulfoxide, dimethyl sulfone, tetramethylurea, hexamethylphosphoramide, phenol, o-cresol, m-cresol, p-cresol, m-cresylic acid, p-chlorophenol, anisole, benzene, toluene, and xylene. These organic solvents may be used alone or as a mixture of two or more thereof. Preferred of these is, for example, N,N-dimethylacetamide.

The reaction of 2,2-bis(4-(3,4-dicarboxyphenoxy)phenyl] propane dianhydride (BSAA) with the diamine in an organic solvent may be accomplished by mixing the acid anhydride with the diamine in the solvent with stirring. For example, use may be made of a method comprising dissolving the diamine in an organic solvent, adding the acid anhydride thereto, and mixing the ingredients by stirring or a method comprising adding the diamine and the acid anhydride to an organic solvent and mixing the ingredients by stirring. The reaction between 2-bis[4-(3,4-dicarboxyphenoxy)phenyl] propane dianhydride (BSAA) and the diamine is conducted generally at ordinary pressure and a temperature of 100° C. or lower, preferably 80° C. or lower. The reaction time is generally in the range of from 4 to 24 hours, although it depends on the diamine used and on the solvent and reaction temperature.

The poly(amic acid) thus obtained has a number-average molecular weight in the range of generally from 1,000 to 100,000, preferably from 5,000 to 50,000.

As stated above, the poly(amic acid) thus obtained is thermally imidized by heating to 100 to 300° C. or chemically imidized with an imidizing agent, e.g., acetic anhydride, whereby a polyimide can be obtained. A polyimide can be obtained also by suspending or dissolving 2,2-bis[4-(3,4-dicarboxyphenoxy)phenyl]propane dianhydride (BSAA) and the diamine in an organic solvent and then heating the suspension or solution to form a poly(amic acid) and simultaneously conduct imidization.

The lightguide of the invention has a waveguide layer made of such a polyimide. A lightguide having such waveguide layers can be obtained by known methods. For example, when the lightguide is an embedded type lightguide, it can be produced in the following manner as shown in FIG. 1. First, as shown in FIG. 1(A), a polyimide film is formed as a lower cladding layer 2 on an appropriate substrate 1, e.g., a synthetic silica glass plate. Subsequently, a poly(amic acid) solution is applied on the lower cladding layer 2 by, e.g., spin coating and heated to form a polyimide film 3 having a higher refractive index than the lower cladding layer, as shown in FIG. 1(B). Thereafter, this polyimide film 3 is subjected, for example, to photolithographic patterning and dry etching, e.g., RIE (reactive ion etching), to form rectangular core layers 4 serving as waveguide layers, as shown in FIG. 1(C). Finally, an upper cladding layer 5 made of a polyimide having a lower refractive index than the core layers is formed on the core layers 4 and the lower cladding layer 2 as shown in FIG. 1(D). Thus, an embedded type lightguide can be obtained.

However, the materials of the upper cladding layer and lower cladding layer are not limited to polyimides, and any polymer may be used for forming the cladding layers as long as it has a lower refractive index than the core layers.

Furthermore, according to the invention, various fillers in general use in resin compositions may be incorporated into the polyimide as long as this incorporation does not impair the properties of the lightguide. Examples of such fillers include wearing resistance improvers such as graphite, Carborundum, powdered silica rock, molybdenum disulfide, and fluororesins; reinforcements such as glass fibers and carbon fibers; flame retardants such as antimony trioxide, magnesium carbonate, and calcium carbonate; electrical-property improvers such as clay and mica; anti-tracking agents such as asbestos, silica, and graphite; acid resistance improvers such as barium sulfate, silica, and calcium meta-silicate; thermal-conductivity improvers such as iron powder, zinc powder, aluminum powder, and copper powder; and other fillers such as glass beads, glass spheres, talc, diatomaceous earth, alumina, Shirasu balloons, alumina hydrate, metal oxides, and colorants.

EXAMPLES

The present invention will be illustrated in greater detail with referent to the following Examples, but the invention should not be construed as being limited thereto.

Reference Example 1
Preparation of Polyimide

Into a vessel equipped with a stirrer, reflux condenser, and nitrogen introduction tube were introduced 13.0 g (0.025 mol) of 2,2-bis[4-(3,4-dicarboxyphenoxy)phenyl]propane dianhydride (BSAA), 8.00 g (0.025 mol) of 2,2'-bis(trifluoromethyl)-4,4'-diaminobiphenyl (BTFB), and 50 g of N,N-dimethylacetamide. The ingredients were mixed by stirring at room temperature for 24 hours to obtain a poly(amic acid) solution in N,N-dimethylacetamide.

The poly(amic acid) solution thus obtained was cast on a synthetic silica glass plate and heated at 350° C. for 1 hour in a nitrogen atmosphere to obtain a polyimide film having a thickness of 10 μm. The refractive index of this film was measured with a prism coupler (633-nm light) and was found to be 1.6101. The transmittance thereof at 850 nm as measured with a spectrophotometer was 99%.

Reference Example 2
Preparation of Polyimide

A poly(amic acid) solution in N,N-dimethylacetamide was obtained in the same manner as in Reference Example 1, except that 7.31 g (0.025 mol) of 1,3-bis(3-aminophenoxy)benzene (APB) was used as a diamine. A polyimide film having a thickness of 10 μm was obtained therefrom in the same manner. The refractive index and transmittance of this film were measured in the same manner as in Reference Example 1 and were found to be 1.6559 and 96%, respectively.

Reference Example 3
Preparation of Polyimide

Into a vessel equipped with a stirrer, reflux condenser, and nitrogen introduction tube were introduced 13.0 g (0.025 mol) of BSAA and 40 g of N,N-dimethylacetamide. The contents were stirred at 60° C. Thereafter, a solution prepared by dissolving 4.26 g (0.025 mol) of isophoronediamine in 20 g of N,N-dimethylacetamide was added dropwise to the N,N-dimethylacetamide solution of BSAA over 1 hour. The resultant mixture was stirred at 60° C. for 4 hours, subsequently cooled to room temperature, and then further stirred for 2 hours to obtain a poly(amic acid) solution in N,N-dimethylacetamide.

The poly(amic acid) solution thus obtained was cast on a synthetic silica glass plate and heated at 300° C. for 1 hour in a nitrogen atmosphere to obtain a polyimide film having a thickness of 10 μm. The refractive index and transmittance of this film were measured in the same manner as in Reference Example 1 and were found to be 1.5936 and 97%, respectively.

Reference Example 4
Preparation of Polyimide

In a separable flask having a capacity of 500 mL, 16.0 g (0.05 mol) of BTFB was dissolved in 153 g of N,N-dimethylacetamide in a nitrogen atmosphere. To this solution was added, with stirring, 22.2 g (0.05 mol) of 2,2-bis(3,4-dicarboxyphenyl)hexafluoropropane dianhydride (6FDA). Thereafter, the resultant mixture was stirred at room temperature for 24 hours to obtain a poly(amic acid) solution in N,N-dimethylacetamide.

The poly(amic acid) solution thus obtained was cast on a synthetic silica glass plate and heated at 350° C. for 1 hour in a nitrogen atmosphere to obtain a polyimide film having a thickness of 10 μm. The refractive index and transmittance of this film were measured in the same manner as in Reference Example 1 and were found to be 1.5535 and 92%, respectively.

Reference Example 5
Preparation of Polyimide

In a separable flask having a capacity of 500 mL, 7.31 g (0.025 mol) of 1,3-bis(3-aminophenoxy)benzene (APB) was dissolved in 50 g of N,N-dimethylacetamide in a nitrogen atmosphere. To this solution was added 5.45 g (0.025 mol) of pyromellitic dianhydride (PMDA) over 30 minutes. Thereafter, the resultant mixture was stirred at room temperature for 24 hours to obtain a poly(amic acid) solution in N,N-dimethylacetamide.

The poly(amic acid) solution thus obtained was cast on a synthetic silica glass plate and heated at 300° C. for 1 hour in a nitrogen atmosphere to obtain a polyimide film having a thickness of 10 μm. The transmittance of this film was measured in the same manner as in Reference Example 1 and was found to be 85%.

Example 1

A polyimide film having a thickness of 10 μm was formed as a lower cladding layer from 6FDA and BTFB on a synthetic silica glass substrate having a thickness of 1 mm in the same manner as in Reference Example 4. Subsequently, a polyimide film having a thickness of 8 μm was formed from BSAA and BTFB on the lower cladding layer in the same manner as in Reference Example 1. Thereafter, this polyimide film was processed by photolithography and a dry-etching technique to form a core layer (waveguide layer) having sectional dimensions of 8 μm×8 μm. Furthermore, a polyimide film having a thickness of 15 μm was formed as an upper cladding layer from 6FDA and BTFB in the same manner as for the lower cladding layer to coat the core layer and the lower cladding layer. Thus, an embedded type lightguide was produced. This lightguide was evaluated for loss at a wavelength of 0.85 μm by the cutback method. As a result, the transmission loss thereof was found to be 1.0 dB/cm.

Example 2

An embedded type lightguide was produced in the same manner as in Example 1, except that the core layer (waveguide layer) having sectional dimensions of 8 μm×8 μm was formed by forming a polyimide film having a thickness of 8 μm from BSAA and APB in the same manner as in Reference Example 2 and then processing this polyimide film by photolithography and a dry-etching technique. The transmission loss of this lightguide was measured in the same manner as in Example 1 and was found to be 1.4 dB/cm.

Example 3

An embedded type lightguide was produced in the same manner as in Example 1, except that the core layer (waveguide layer) having sectional dimensions of 8 μm×8 μm was formed by forming a polyimide film having a thickness of 8 μm from BSAA and isophoronediamine in the same manner as in Reference Example 3 and then processing this polyimide film by photolithography and a dry-etching technique. The transmission loss of this lightguide was measured in the same manner as in Example 1 and was found to be 1.2 dB/cm.

Example 4

An embedded type lightguide was produced in the same manner as in Example 1, except that the lower and upper cladding layers were formed by forming polyimide films having thickness of 10 μm and of 15 μm, respectively, each from BSAA and BTFB in the same manner as in Reference Example 1, and that the core layer (waveguide layer) having sectional dimensions of 8 μm×8 μm was formed by forming a polyimide film having a thickness of 8 μm from BSAA and APB in the same manner as in Reference Example 2 and then processing this polyimide film by photolithography and a dry-etching technique. The transmission loss of this lightguide was measured in the same manner as in Example 1 and was found to be 1.5 dB/cm.

Comparative Example 1

An embedded type lightguide was produced in the same manner as in Example 1, except that the core layer (waveguide layer) having sectional dimensions of 8 μm×8 μm was formed by forming a polyimide film having a thickness of 8 μm from PMDA and APB in the same manner as in Reference Example 5 and then processing this polyimide film by photolithography and a dry-etching technique. The transmission loss of this lightguide was measured in the same manner as in Example 1 and was found to be 3.4 dB/cm.

The lightguide of the invention has a waveguide layer comprising a polyimide obtained from 2,2-bis[4-(3,4-dicarboxyphenoxy)phenyl]propane dianhydride (BSAA) and a diamine. This polyimide not only has the physical properties, such as heat resistance, peculiar to polyimides but also has high transparency. Consequently, a lightguide having a low transmission loss can be obtained at low cost.

While the present invention has been described in detail and with reference to specific embodiments thereof, it will be apparent to one skilled in the art that various changes and modifications can be made therein without departing from the spirit and scope thereof.

The present application is based on Japanese patent application No. 2003-140278 filed May 19, 2003, and the content thereof is herein incorporated by reference.

What is claimed is:

1. A polymer lightguide which has a waveguide layer comprising a polyimide having a repeating unit represented by general formula (I):

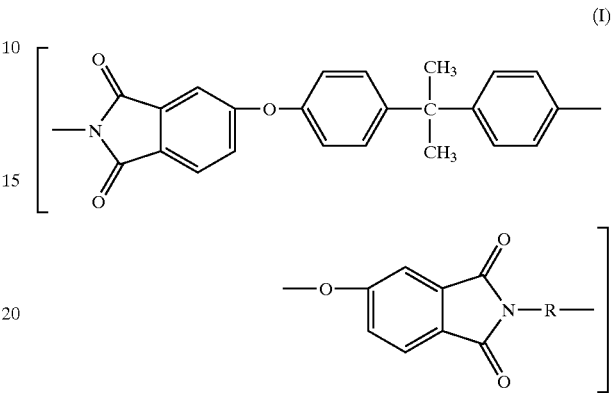

wherein R represents a bivalent organic group.

2. The polymer lightguide of claim 1, wherein the bivalent group R in formula (I) is represented by general formula (II):

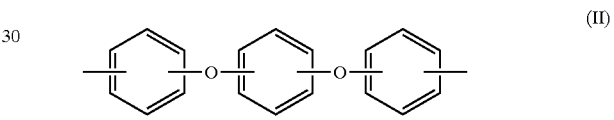

or formula (III):

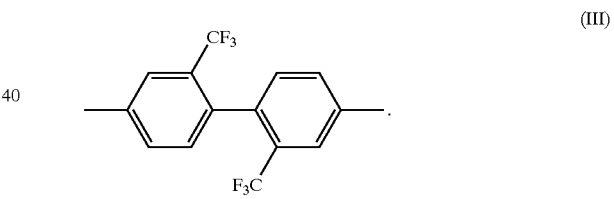

3. The polymer lightguide of claim 2, wherein the bivalent group R in formula (I) is at least one member selected from 1,3-bis(3-aminophenoxy)benzene, 1,3-bis(4-aminophenoxy)benzene, 1,4-bis(3-aminophenoxy)benzene, 1,4-bis[4-aminophenoxy]benzene, and 2,2'-bis(trifluoromethyl)-4,4'-diaminobiphenyl.

4. The polymer lightguide of claim 1, wherein the bivalent group R in formula (I) is a residue of an alicyclic diamine.

5. The polymer lightguide of claim 4, wherein the bivalent group R in formula (I) is a residue of isophoronediamine.

6. The polymer lightguide of claim 1, wherein the polymide has a number-average molecular weight of from 1,000 to 1000,000.

7. The polymer lightguide of claim 6, wherein the number-average molecular weight is from 5,000 to 50,000.